United States Patent
Diment

(10) Patent No.: US 11,935,523 B2
(45) Date of Patent: Mar. 19, 2024

(54) DETECTION OF CORRECTNESS OF PRONUNCIATION

(71) Applicant: Master English Oy, Tampere (FI)

(72) Inventor: Aleksandr Diment, Tampere (FI)

(73) Assignee: Master English Oy, Tampere (FI)

( * ) Notice: Subject to any disclaimer, the term of this patent is extended or adjusted under 35 U.S.C. 154(b) by 178 days.

(21) Appl. No.: 16/684,619

(22) Filed: Nov. 15, 2019

(65) Prior Publication Data

US 2021/0151036 A1   May 20, 2021

(51) Int. Cl.
| | |
|---|---|
| *G10L 15/187* | (2013.01) |
| *G06N 3/044* | (2023.01) |
| *G06N 3/08* | (2023.01) |
| *G10L 15/02* | (2006.01) |
| *G10L 15/16* | (2006.01) |
| *G10L 15/22* | (2006.01) |

(52) U.S. Cl.
CPC ........... *G10L 15/187* (2013.01); *G06N 3/044* (2023.01); *G06N 3/08* (2013.01); *G10L 15/02* (2013.01); *G10L 15/16* (2013.01); *G10L 15/22* (2013.01); *G10L 2015/025* (2013.01)

(58) Field of Classification Search
CPC ....... G10L 15/187; G10L 15/22; G10L 15/02; G10L 15/16; G06N 3/08; G06N 3/04
See application file for complete search history.

(56) References Cited

U.S. PATENT DOCUMENTS

| | | | |
|---|---|---|---|
| 7,392,184 B2 * | 6/2008 | Viiki | G10L 15/08 |
| 11,132,990 B1 * | 9/2021 | Sun | G10L 15/08 |
| 2019/0287519 A1 * | 9/2019 | Ediz | G10L 15/197 |
| 2021/0082311 A1 * | 3/2021 | Karas | G09B 19/04 |
| 2021/0256961 A1 * | 8/2021 | Garman | G10L 13/10 |

* cited by examiner

*Primary Examiner* — Richemond Dorvil
*Assistant Examiner* — Ethan Daniel Kim
(74) *Attorney, Agent, or Firm* — Laine IP Oy

(57) ABSTRACT

There is provided automatic detection of pronunciation errors in spoken words utilizing a neural network model that is trained for a target phoneme. The target phoneme may be a phoneme in English language. The pronunciation errors may be detected in English words.

14 Claims, 13 Drawing Sheets

DETECTION OF CORRECTNESS OF PRONUNCIATION

FIELD

Various example embodiments relate to detection of correctness of the pronunciation.

BACKGROUND

Learning a foreign language has been associated with the need for face-to-face tutoring. There exist, however, computer-assisted language learning (CALL) systems that may offer mobile tutoring using advances in machine learning. Computer-assisted pronunciation training (CAPT) applies machine learning methods to enable detection of correctness of the pronunciation.

Word-specific models operating on complete word utterances impose large memory requirements.

SUMMARY

According to some aspects, there is provided the subject-matter of the independent claims. Some embodiments are defined in the dependent claims. The scope of protection sought for various embodiments is set out by the independent claims. The embodiments, examples and features, if any, described in this specification that do not fall under the scope of the independent claims are to be interpreted as examples useful for understanding various embodiments.

According to a first aspect, there is provided a method, comprising: receiving an audio waveform of a recording comprising a pronounced word comprising a target phoneme; transforming the audio waveform to a sequence of frames; extracting one or more acoustic features from the sequence of frames; receiving a sequence of phonetic symbols representing ideal pronunciation of the pronounced word; mapping the sequence of phonetic symbols using a neural network trained for the target phoneme to obtain an embedded phonetic sequence; classifying, by a neural network trained for the target phoneme, a pronunciation in the recording as correct or as comprising one or more pronunciation errors in the target phoneme based on the one or more acoustic features and the embedded phonetic sequence.

According to an embodiment, the classifying comprises concatenating the one or more acoustic features and the embedded phonetic sequence to learn the neural network capable of detecting one or more pronunciation errors in the target phoneme from the one or more acoustic features.

According to an embodiment the method further comprises inputting the embedded phonetic sequence to a recurrent block.

According to an embodiment, the method further comprises inputting the one or more acoustic features to a recurrent block.

According to an embodiment, the method further comprises classifying, in response to detecting that a likelihood of the pronunciation error is below a pre-determined threshold, a pronunciation in the recording as correct.

According to an embodiment, the method further comprises providing feedback to a user based on the classified pronunciation.

According to an embodiment, the method further comprises selecting, in response to classifying the pronunciation as comprising one or more pronunciation errors in the target phoneme, a video showing correct pronunciation of the word comprising the target phoneme; and providing the selected video for display.

According to an embodiment, the method further comprises selecting, in response to classifying the pronunciation as comprising one or more pronunciation errors in the target phoneme, one or more further words comprising the target phoneme, wherein the one or more further words are different than the pronounced word in the recording; providing a user with the one or more further words to be pronounced.

According to an embodiment, the pronounced word comprises a second target phoneme; and the method further comprises mapping the sequence of phonetic symbols using a neural network trained for the second target phoneme to obtain a second embedded phonetic sequence; and classifying, by a neural network trained for the second target phoneme, a pronunciation in the recording as correct or comprising one or more pronunciation errors in the second target phoneme based on the one or more acoustic features and the second embedded phonetic sequence.

According to a second aspect, there is provided an apparatus comprising at least one processor; and at least one memory including computer program code, the at least one memory and the computer program code configured to, with the at least one processor, cause the apparatus to perform receiving an audio waveform of a recording comprising a pronounced word comprising a target phoneme; transforming the audio waveform to a sequence of frames; extracting one or more acoustic features from the sequence of frames; receiving a sequence of phonetic symbols representing ideal pronunciation of the pronounced word; mapping the sequence of phonetic symbols using a neural network trained for the target phoneme to obtain an embedded phonetic sequence; classifying, by a neural network trained for the target phoneme, a pronunciation in the recording as correct or as comprising one or more pronunciation errors in the target phoneme based on the one or more acoustic features and the embedded phonetic sequence.

According to an embodiment, the apparatus is further configured to perform inputting the embedded phonetic sequence to a recurrent block.

According to an embodiment, the apparatus is further configured to perform inputting the one or more acoustic features to a recurrent block.

According to an embodiment, the apparatus is further configured to perform classifying, in response to detecting that a likelihood of the pronunciation error is below a pre-determined threshold, a pronunciation in the recording as correct.

According to an embodiment, the apparatus is further configured to perform providing feedback to a user based on the classified pronunciation.

According to an embodiment, the apparatus is further configured to perform selecting, in response to classifying the pronunciation as comprising one or more pronunciation errors, a video showing correct pronunciation of the word comprising the target phoneme; and providing the selected video for display.

According to an embodiment, the apparatus is further configured to perform selecting, in response to classifying the pronunciation as comprising one or more pronunciation errors in the target phoneme, one or more further words comprising the target phoneme, wherein the one or more further words are different than the pronounced word in the recording; and providing a user with the one or more further words to be pronounced.

According to an embodiment, the pronounced word comprises a second target phoneme; and the apparatus is further configured to perform mapping the sequence of phonetic symbols using a neural network trained for the second target phoneme to obtain a second embedded phonetic sequence; and classifying, by a neural network trained for the second target phoneme, a pronunciation in the recording as correct or comprising one or more pronunciation errors in the second target phoneme based on the one or more acoustic features and the second embedded phonetic sequence.

According to a third aspect, there is provided an optionally non-transitory computer readable medium comprising program instructions that, when executed by at least one processor, cause an apparatus to at least perform: receiving an audio waveform of a recording comprising a pronounced word comprising a target phoneme; transforming the audio waveform to a sequence of frames; extracting one or more acoustic features from the sequence of frames; receiving a sequence of phonetic symbols representing ideal pronunciation of the pronounced word; mapping the sequence of phonetic symbols using a neural network trained for the target phoneme to obtain an embedded phonetic sequence; classifying, by a neural network trained for the target phoneme, a pronunciation in the recording as correct or as comprising one or more pronunciation errors in the target phoneme based on the one or more acoustic features and the embedded phonetic sequence.

According to a further aspect, there may be provided a computer program configured to cause the method discloses herein to be performed.

DETAILED DESCRIPTION

Phoneme is a unit of sound that distinguishes one word from another in a particular language. Different languages have a different number of phonemes. For example, there is considered to be 44 or 45 phonemes, depending on the reference used, in British English language. Received Pronunciation (RP) is an accent of standard English which is generally considered to comprise 44 phonemes. The phonemes may be categorized into consonants and vowels. There is a symbol for each phoneme. The symbols may be based on international phonetic alphabet (IPA) which is an alphabetic system of phonetic notation based primarily on the Latin alphabet. The symbols may be used in phonetic transcription of spoken words. Phonetic transcription is a visual representation of speech sounds which helps to pronounce a word correctly.

A list of phonemes in British English language may be as follows: aɪ, aʊ, b, d, dʒ, eɪ, f, g, h, i, iː, j, k, l, m, n, p, s, t, tʃ, uː, v, w, z, æ, ð, ŋ, ɐ, ɑː, ɒ, ɔɪ, ɔː, ɐ, ə, əʊ, ɛ, ɛə, ɜː, ɪ, ɪə, ɹ, ʃ, ʊ, ʊə, ʒ, θ.

Especially for foreign speakers, it is common to make pronunciation errors. There are some typical errors that may be classified. For example, for Finns, the typical error may be classified as follows:

vowel: a vowel error, e.g. vowel [ɪ] becoming [e] on the first syllable of the word begin;

dentalisation: e.g. bilabial [w] becomes labio-dental [v], e.g. in words worse, wet, wine;

approximant: phoneme [v] is rather an approximant than a fricative, e.g. in words very, vet, vine voice, verse;

plosive: [θ] or [ð] not dental enough (tongue should be between the teeth), e.g. in words through, than, thin, weather;

aspiration: missing aspiration in phonemes [p], e.g. in words push, prince, pull, pear; [t], e.g. in words fantastic, tie; [k], e.g. in words cave, control, card, coat;

voicing: voiced consonants becoming voiceless, e.g. [z] in goes, [ð] in bathe, [dʒ] in joke, [d] in bed other: various kinds of other errors, e.g. rolling r, affricate [tʃ] or fricative [ʃ] becomes like plosive [t] in the word structure, alveolar [s] instead of palate-alveolar [ʃ] in the words education and fish, affricate [tʃ] becoming more like combination [ts] in the word rich.

Computer-assisted pronunciation training (CAPT) applies machine learning methods to enable detection of correctness of the pronunciation. Word-specific models operating on complete word utterances impose large memory requirements, since such models should be trained for each word separately.

There is provided a system for automatic detection of pronunciation errors in spoken words utilizing a neural network model that is trained for a target phoneme. Target phoneme may be a phoneme in English language. The system may be for detection of pronunciation errors in English words.

Figure 1:
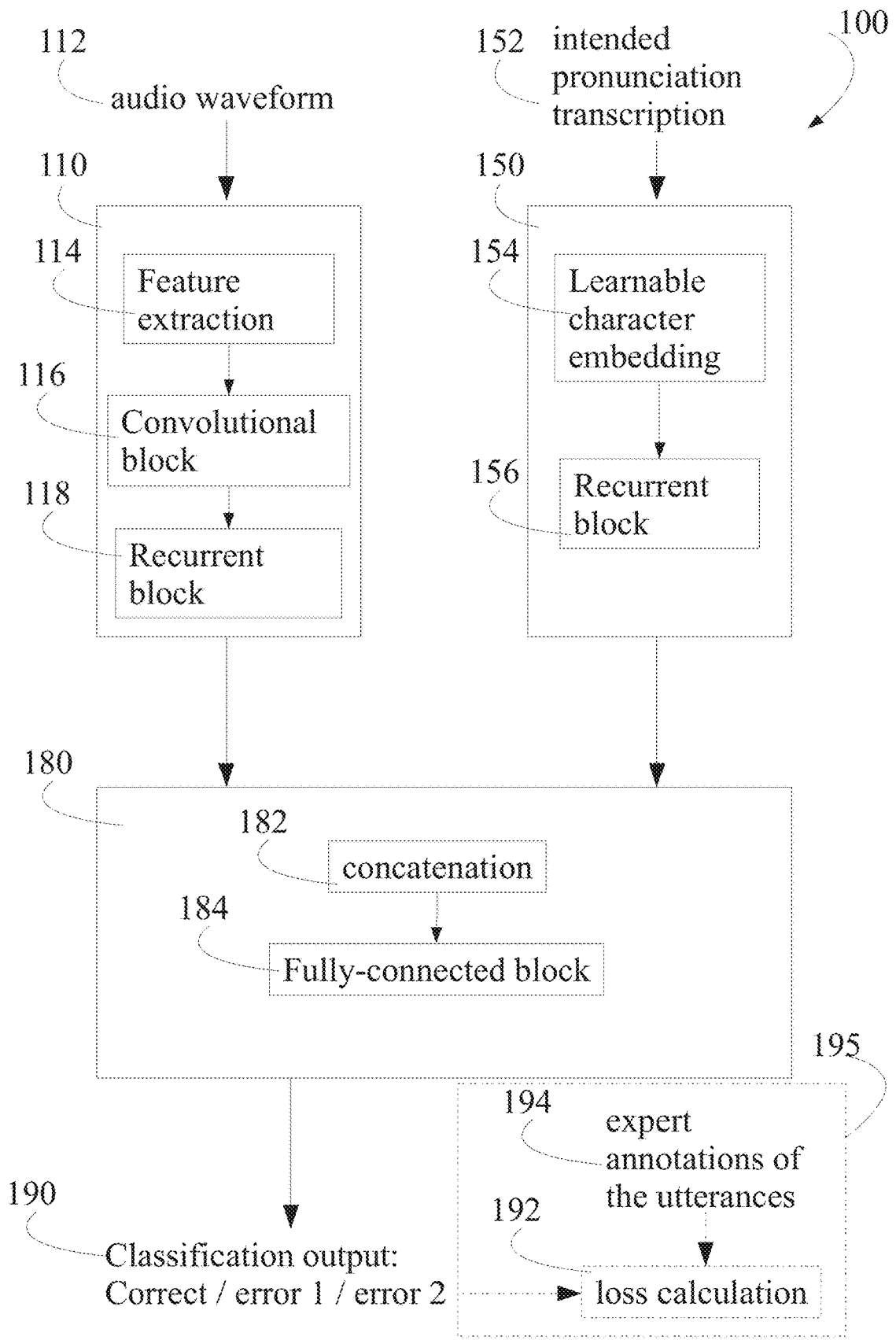
FIG. 1 shows, by way of example, a block diagram of a system for automatic detection of pronunciation errors.
Figure 2:
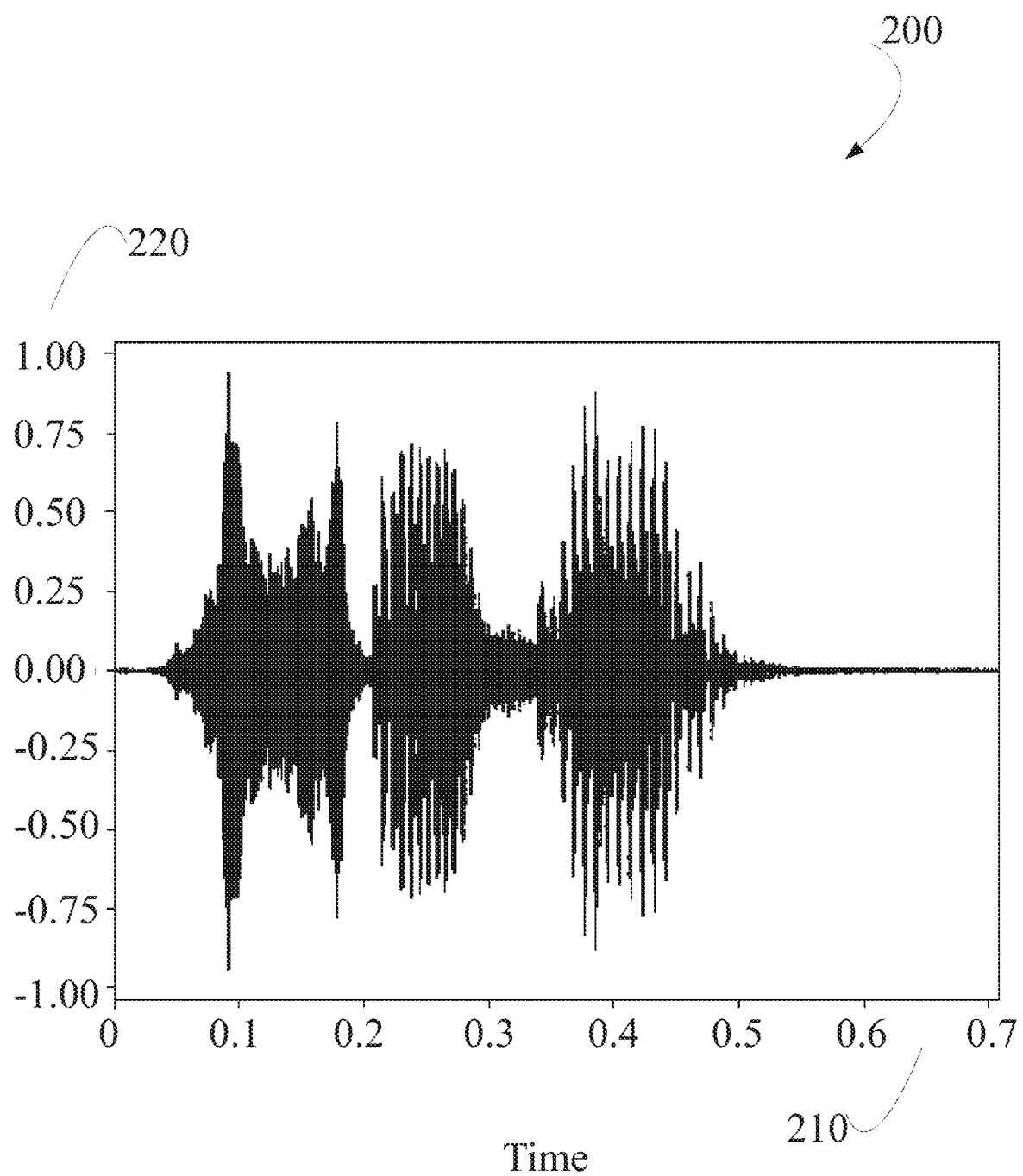
FIG. 2 shows, by way of example, an audio waveform.

FIG. 1 shows, by way of example, a block diagram 100 of a system for automatic detection of pronunciation errors. An acoustic branch 110 receives, as input, an audio waveform 112 of a recording in which a user pronounces a word. The word comprises one or more target phonemes, e.g. a first target phoneme, a second target phoneme, etc. A phonetic branch 150 receives an intended pronunciation transcription 152, i.e. identity of the word, as input. The transcriptions may be received from a memory where they have been stored. The memory may be an internal memory of an apparatus performing the method disclosed herein, or the memory may be an external memory or database or cloud storage. The transcription may be defined by acknowledged dictionary services such as the Cambridge dictionary, Merriam-Webster, etc. In this example, let us consider a word sugar whose transcription may be written as [ʃʊ gə]. FIG. 2 shows an audio waveform 200 of a correct utterance of the word sugar. Correct utterance may be defined as the utterance as given by acknowledged dictionary services such as the Cambridge dictionary, Merriam-Webster, or an electronic pronunciation dictionary based on several dictionaries. For example, Britfone is based on Carnegie Mellon University Pronouncing Dictionary, Collins Dictionary, the Oxford Dictionary, the Cambridge Dictionary and the MacMillan Dictionary. The x-axis 210 represents time in seconds and the y-axis 220 represents the amplitude of an audio signal. The correctness of pronunciation in the audio waveform is to be assessed. Correctness of one phoneme at a time may be assessed using a neural network model trained for a target phoneme. For example, correctness of a particular phoneme may be evaluated in contrast to their realisation in the Received Pronunciation. Several phonemes may be assessed at the same time in parallel using several models each trained for a different target phoneme.

Figure 3A:
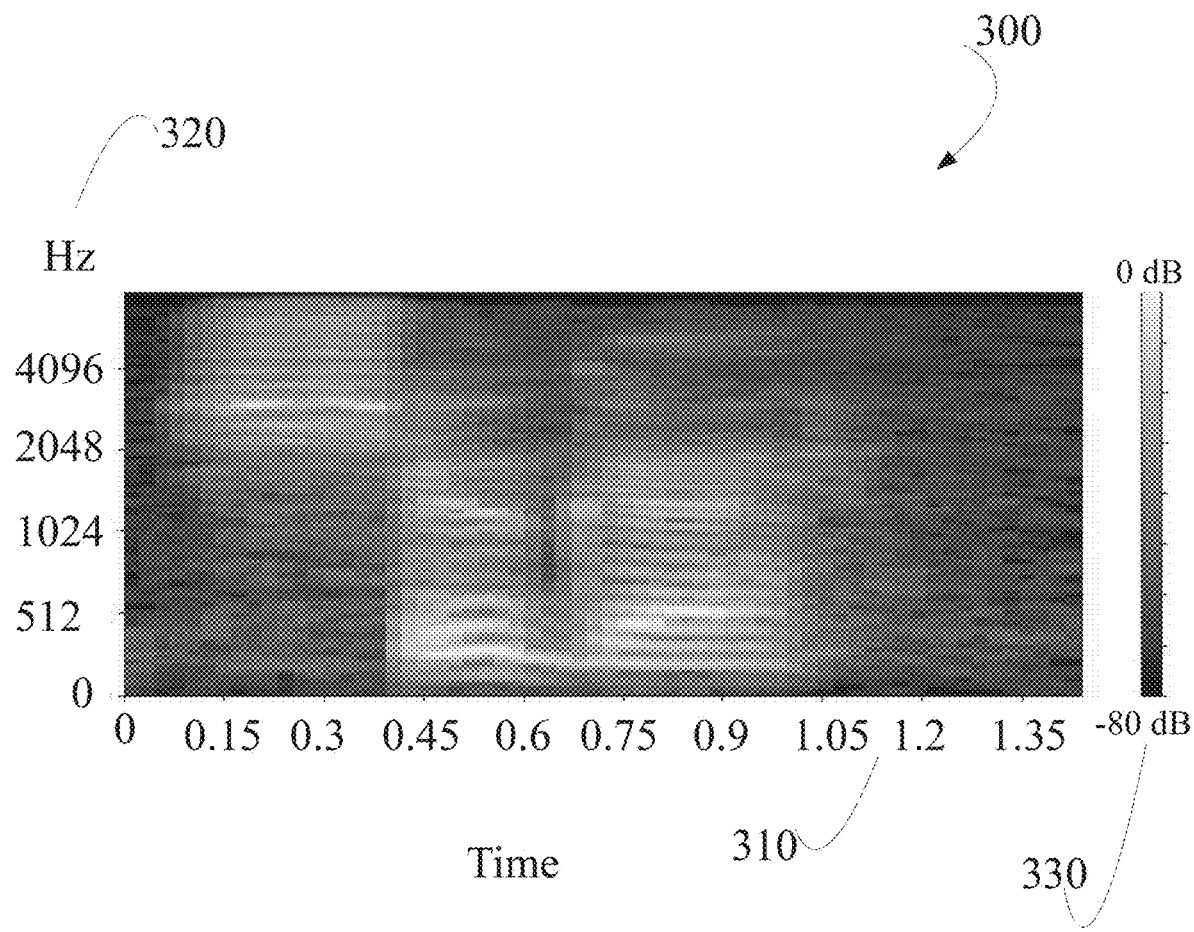
FIG. 3a shows, by way of example, a mel spectrogram.

The waveform may be transformed, by the feature extraction block 114, to a more compact, speech perception motivated representation. The waveform may be transformed to a sequence of frames. For example, the waveform may be represented as a mel-frequency spectrogram or mel-frequncy cepstrum coefficients. FIG. 3a shows, by way of example, a mel spectrogram 300 feature representation of a correct utterance of the word sugar. However, it is to be noted that the input received by the acoustic branch does not necessarily represent a correct utterance of a word. The user may make pronunciation errors in utterance. The x-axis 310 represents time in seconds and the y-axis 320 represents the frequency. The different grey scale values represent different decibel values according to the scale 330.

Figure 3B:
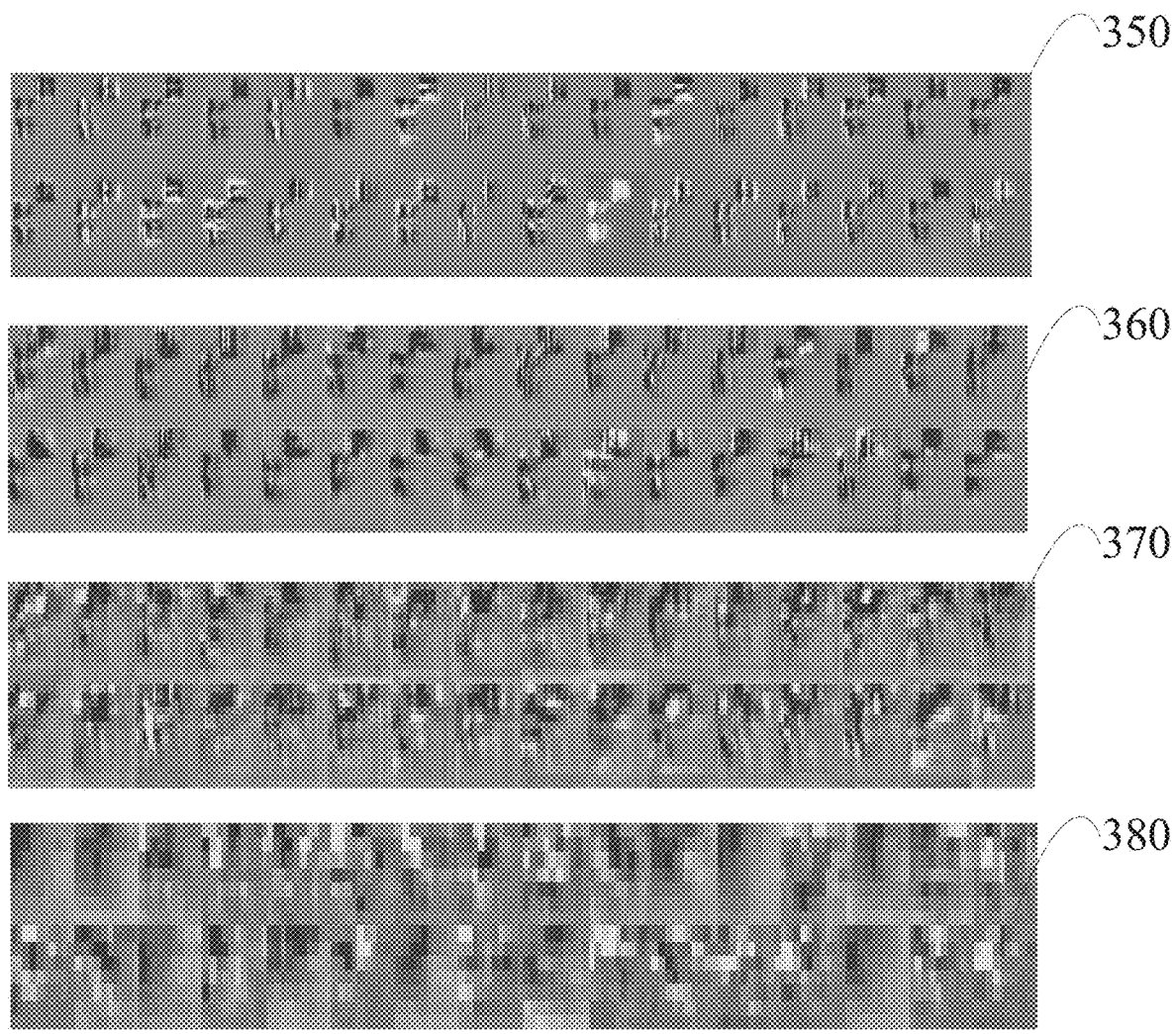
FIG. 3b shows, by way of example, activation of filters of convolutional block.

After the features have been extracted from the waveform, the sequence of the features may be processed by a convolutional block 116. The convolutional block may comprise layers such as convolutional, max-pooling and/or batch-normalisation layers. The weights of the convolutional layers are trainable during training. The layers may extract high-level features. The features may be invariant to shifts in time and frequency. FIG. 3b shows, by way of example, activations of the filters 350, 360, 370, 380 of the convolution block 116 on a correct utterance of the word sugar.

Output from the convolutional block, i.e. the extracted features, may be optionally fed into a recurrent block 118. The recurrent block may comprise long short-term memory layers, i.e. LSTM layers. The weights of the layers are trainable during training. The LSTM layers may process the sequential nature of the data, i.e. of the features. This may allow for retaining the information from the frames which may be important for classification task. Additionally, using the recurrent block may allow for performing the task on the whole word utterance, as opposed to extracting a segment with the target phoneme.

Figure 3C:
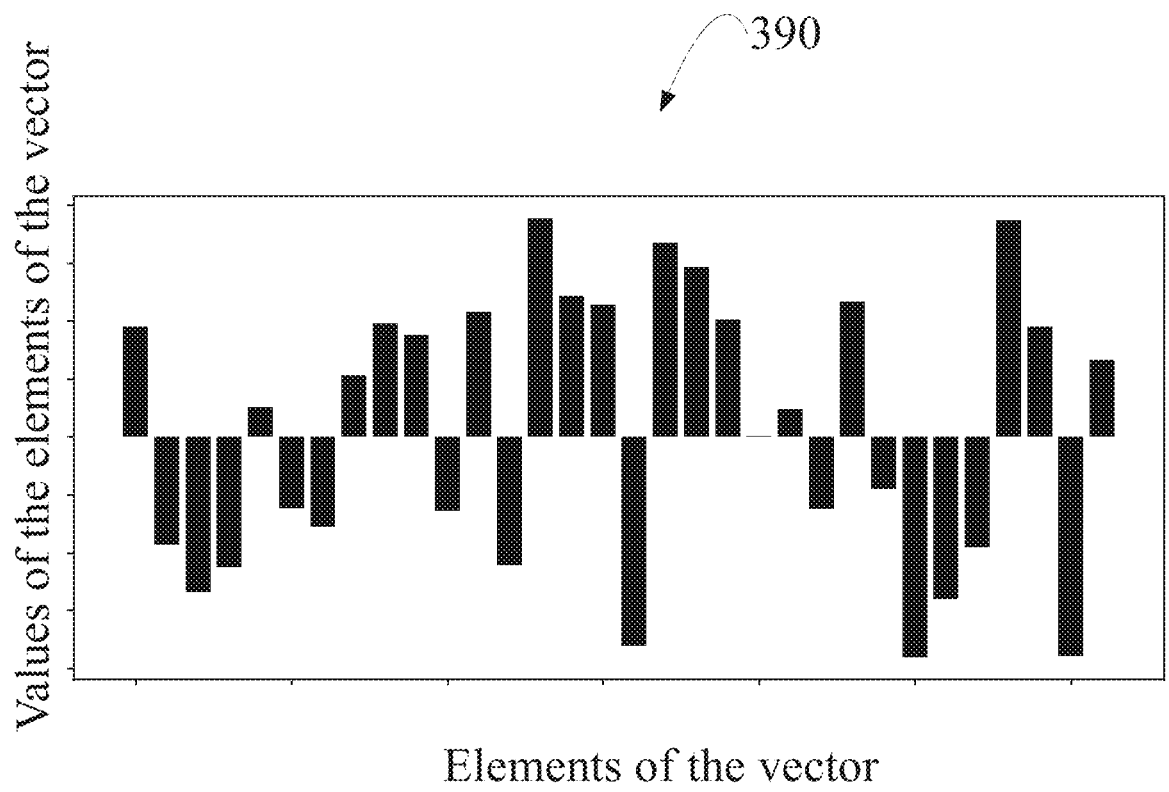
FIG. 3c shows, by way of example, output from an acoustic branch.

Output from the acoustic branch is thus a representation of acoustic frames. For example, the output may be a vector. For example, for an utterance "sugar", the output of the acoustic branch of a trained network where the acoustic branch LSTM has 32 hidden units is a 32-dimensional vector. FIG. 3c shows the vector as a bar plot 390.

The phonetic branch 150 receives an intended pronunciation transcription 152 as input. The input may be variable-length input comprising a sequence of phonetic symbols standing for ideal pronunciation of the target word. The symbols may be encoded, e.g. integer-encoded. For example, for the word sugar the phonetic representation [ʃ ʊ gə] may be encoded as [41, 42, 8, 33]. The sequence of phonetic symbols may be padded with zeros for the words, whose transcription is shorter than a pre-defined maximum. The time-steps corresponding to the padded zeros may be masked. Thus, contribution of those time-steps to the computation of the loss value and weight update may be ignored.

The symbols, or the integers, may be mapped to a dimension, e.g. to a small dimension of 10, using a neural network, e.g. a time-distributed embedding layer 154. The weights of the embedding layer are trainable during training. The embedding layer may be able to eliminate the unintended numerical relationship between the integer-encoded phonemes, while being able to train the weights in such a way that relationship between the phonemes in terms of the task in question is learnt. The task may be e.g. separation of certain phonemes from each other, e.g. separating [ʃ] from [s].

Figure 4:
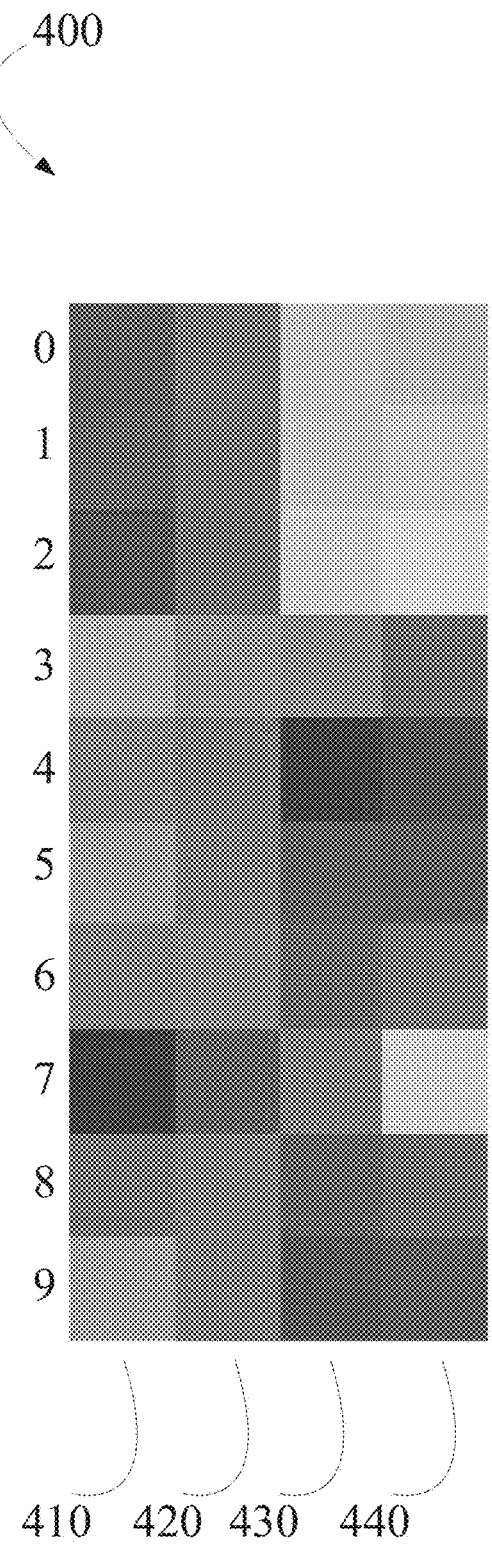
FIG. 4 shows, by way of example, an embedded phonetic sequence.

FIG. 4 shows, by way of example, an embedded phonetic sequence. This example shows a 10-dimensional embeddings of a phonetic representation of the word sugar. Columns 410, 420, 430, 440 represent the phonemes [ʃ], [ʊ], [g], [ə], respectively.

Each phoneme has a random initial location in the embedding space. During the training, the location is shifted in the direction that helps to minimize the objective function. When the model is trained, the annotators listen through the pronunciation samples of different words comprising a specific phoneme. The model is trained for that specific phoneme. The annotator classifies the pronunciation as correct, or as comprising an error. The errors may be classified as described above. During training, the network is provided with examples of correct and erroneous pronunciation. For example, the input from the expert annotators 194 to the loss calculation block 192 may be e.g. [1, 0, 0] which means that the likelihood of correctness of the pronunciation is 1 and the likelihoods of error types are 0. The objective function to be minimized is the error between the predicted and annotated labels for those examples. The error may be measured in different ways, e.g. as a categorical cross-entropy, or as a mean squared error. The dashed line 195 in FIG. 1 surrounds the elements that are, in addition to the acoustic branch, phonetic branch and the decision-making branch, present in the system 100 when the system 100 is being trained. Optimal hyperparameters may be obtained for target phoneme(s). Several training rounds may be performed, e.g. approximately 100, with algorithmically selected hyperparameters. The algorithm may be any suitable algorithm, e.g. sequential model-based optimisation algorithm using the tree-structured Parzen estimate, or grid search or random search. The sequential model-based optimisation algorithm may find the optimum faster. The model with the best performing hyperparameters may be selected to further use.

Figure 5A:
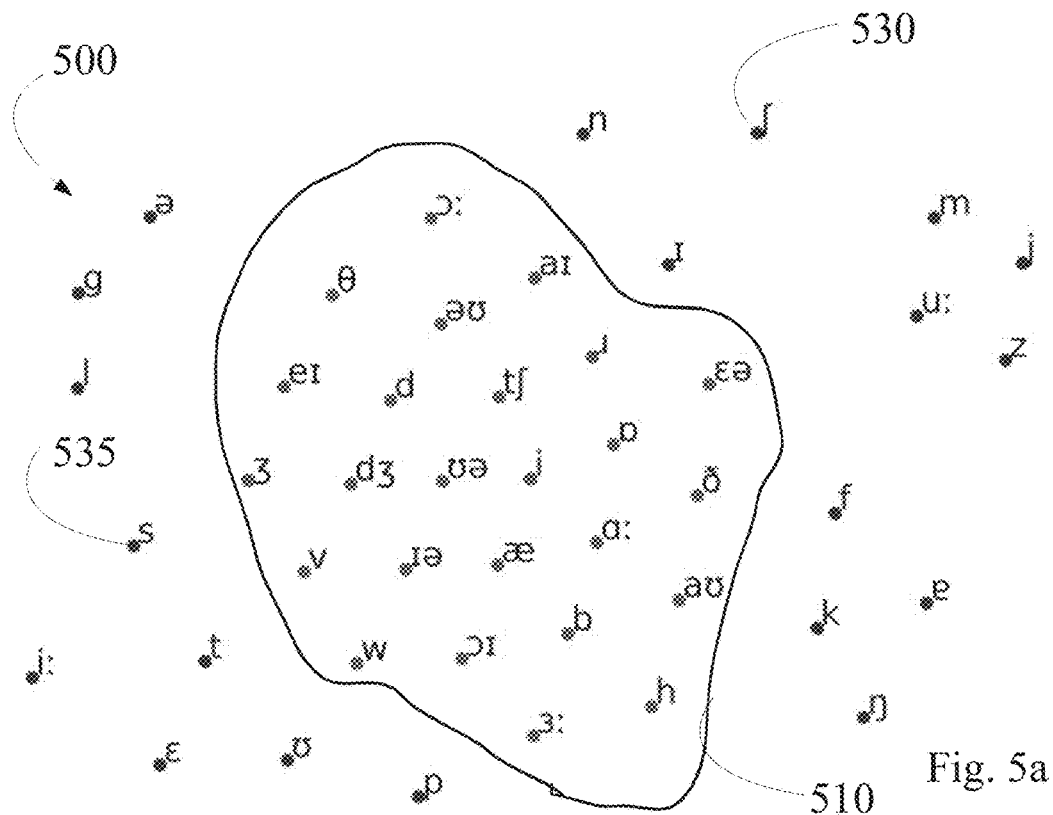
FIG. 5a shows, by way of example, a two-dimensional projection of a learned phoneme symbol embedding space.

FIG. 5a shows, by way of example, a two-dimensional projection 500 of a learned phoneme symbol embedding space. In this example, the pronunciation error detection system has been trained for the target phoneme [ʃ] with words function, musician, push, she, specialist and sugar. More precisely, FIG. 5a shows a t-distributed stochastic neighbour embedding (t-SNE) based two-dimensional projection of the representation of all the English phonemes in the embedding space after training the pronunciation error detection system for the target phone [ʃ] with words function, musician, push, she, specialist and sugar. The phonemes within an area marked with a line 510 are phonemes that have been absent from the training material. Those phonemes are clearly remained consistently clustered at the initialisation position. The rest of the phonemes are phonemes that have been present in the training words. The locations of those phonemes have been shifted. For example, if we consider a target phoneme [ʃ] 530 and its typical erroneous pronunciation as [s] 535, it may be noticed that they are located far from each other. This means that the embedding has learned the importance of separating between the two phonemes.

The sequence of embedded phonetic characters, or the embedded phonetic sequence, may be fed in to a recurrent block 156. The recurrent block may comprise e.g. LSTM layers. The weights of the layers are trainable during training. The last time-step output of the last layer of the recurrent block may provide the phoneme sequence with a corresponding vector representation, independent of the length of the sequence.

Figure 5B:
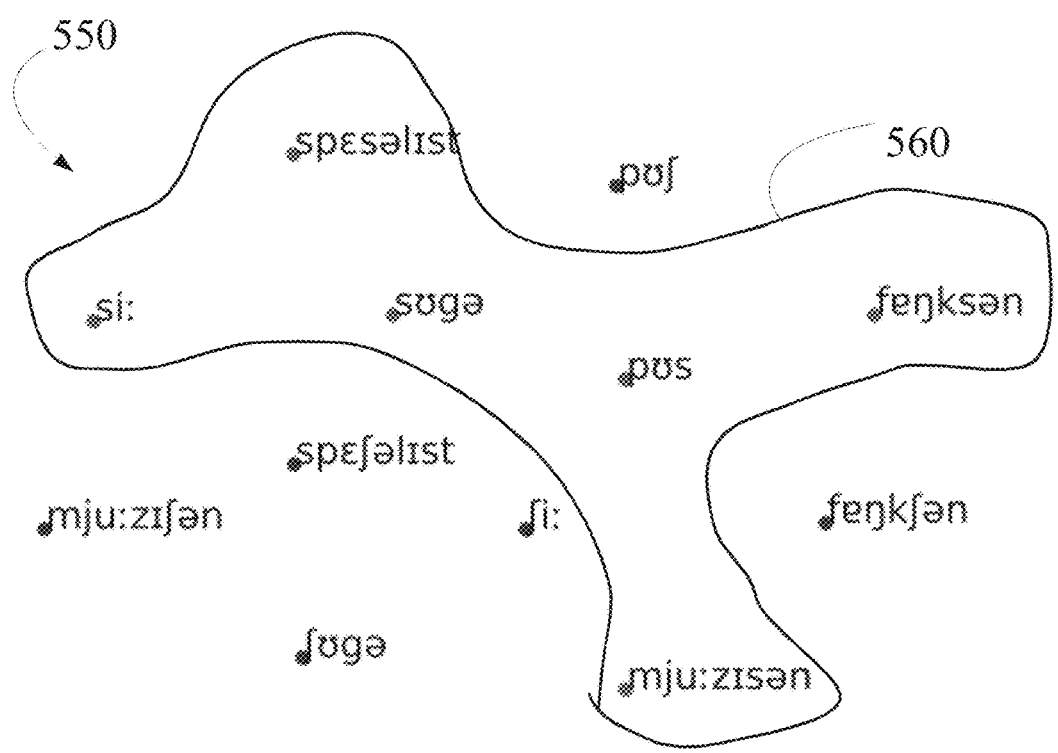
FIG. 5b shows, by way of example, a two-dimensional projection of words used in training a model and their typical erroneous pronunciation.

FIG. 5b shows, by way of example, a two-dimensional projection 550 of words used in training a model and their typical erroneous pronunciation. More precisely, FIG. 5b shows a two-dimensional projection of the recurrent block representation of the words function, musician, push, she, specialist, sugar used in training of the model for target phoneme [ʃ]. In addition, their counterparts, where a typical error of substituting the phoneme [ʃ] with [s] occurs, are represented within the area marked with a line 560. The counterparts are represented to illustrate how the system would treat such minimal pairs, if they were comprised in the training material. During training and inference, however, only intended correct pronunciation is seen by the phonetic branch. Minimal pairs are pairs of words that differ only in one phoneme.

Figure 5C:
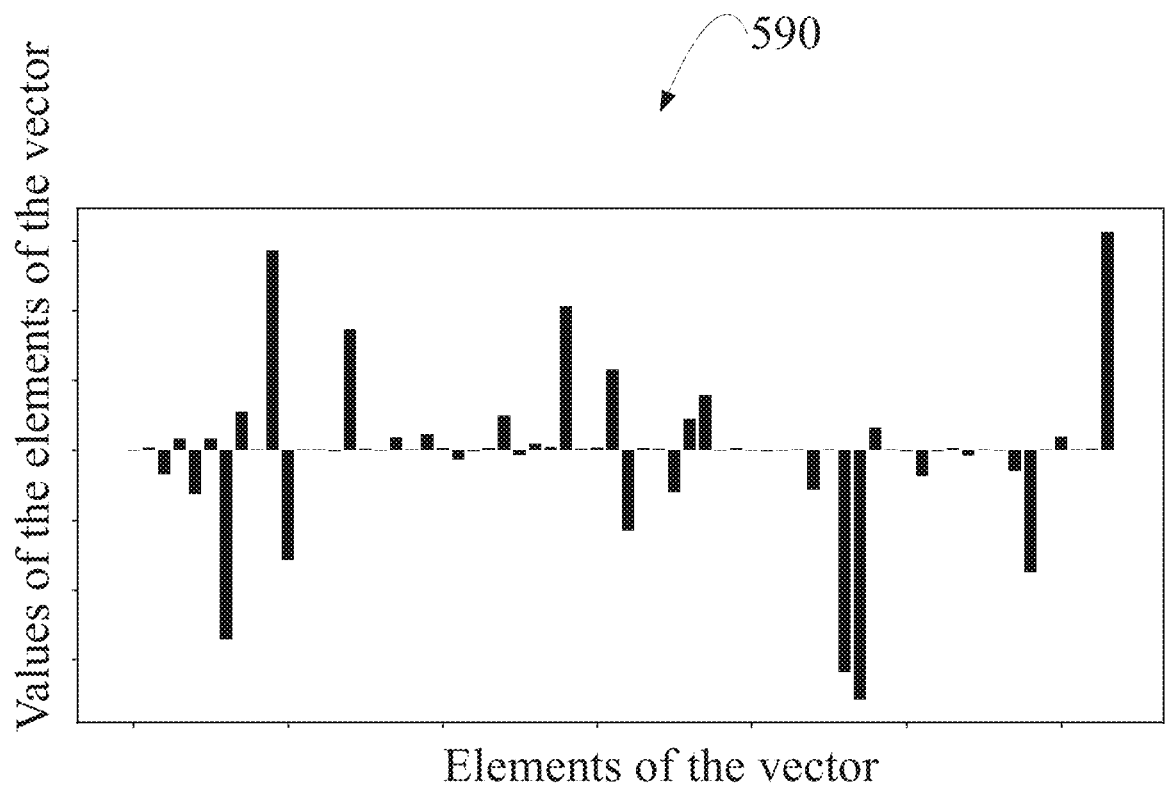
FIG. 5c shows, by way of example, output from a phonetic branch.

FIG. 5c shows, by way of example, output from the phonetic branch in form of a vector as a bar plot 590.

The last time-step outputs of the last recurrent layers of the acoustic branch and the phonetic branch may be merged by concatenation 182 in the decision-making branch 180, to learn the neural network capable of detecting one or more pronunciation errors in the target phoneme from the one or more acoustic features. For example, the neural network may learn to detect one or more pronunciation errors in the target phoneme from the one or more acoustic features due to the merging of concatenation 182 of the last time-step outputs of the last recurrent layers of the acoustic branch and the phonetic branch in the decision-making branch 180. A representation from the phonetic input that is relevant for detecting aspects of pronunciation on a phoneme-basis may be learnt. It may be learned from the vectoral representation of the phoneme symbols and high-level features, or high-level abstraction of the acoustic features, to automatically select and emphasise the elements of both representations that are most important for the task of pronunciation error detection. The one or more acoustic features and the embedded phonetic sequence may be concatenated to learn the neural network, e.g. a joint acoustic-phonetic model, capable of detecting pronunciation error(s) in the target phoneme from the one or more acoustic features. The decision-making branch 180 makes the decision on pronunciation correctness based on both acoustics of the utterance and phonetics of the intended pronunciation. In other words, the decision-making branch may classify the pronunciation in the recording as correct or as comprising one or more errors.

The presence and/or absence of pronunciation errors in the target phoneme may be learnt and detected by a neural network, e.g. a fully-connected block 184. The fully-connected block may comprise multiple dense layers following the concatenation operation. The weights of the layers are trainable during training.

The output 190, e.g. a classification output, may be a set of neurons. The neurons may predict a likelihood of a certain error class or correctness class. For example, the output may be [0.9999267, 0.000073, 0.000002], i.e. the likelihood that the pronunciation is correct is 0.9999267. Likelihood that the pronunciation comprises error 1 is 0.000073. Likelihood that the pronunciation comprises error 2 is 0.000002. The class with the highest likelihood may be predicted and may be given as an output. Alternatively, a decision may be made when the likelihood of a class is above 1/(number of classes). For example, in case of 3 classes, e.g. Correct, Error 1, Error 2, the class that exceeds ⅓=0.33 may produce the prediction.

Thresholds may be pre-determined to the likelihoods. For example, a threshold for Error classes may be adjusted to a value, e.g. 0.85, 0.88, 0.9, or 0.92. Let us consider an example with 3 classes as above. Then, a likelihood of 0.5 may be given, which is above 0.33 but below the pre-determined threshold. Otherwise this would yield an Error prediction, but as the pre-determined threshold is applied, the prediction is not deemed confident enough and thus a Correct prediction may be given. This way, different weights may be given to the misclassifications of the system, and the error prediction is improved.

Figure 6:
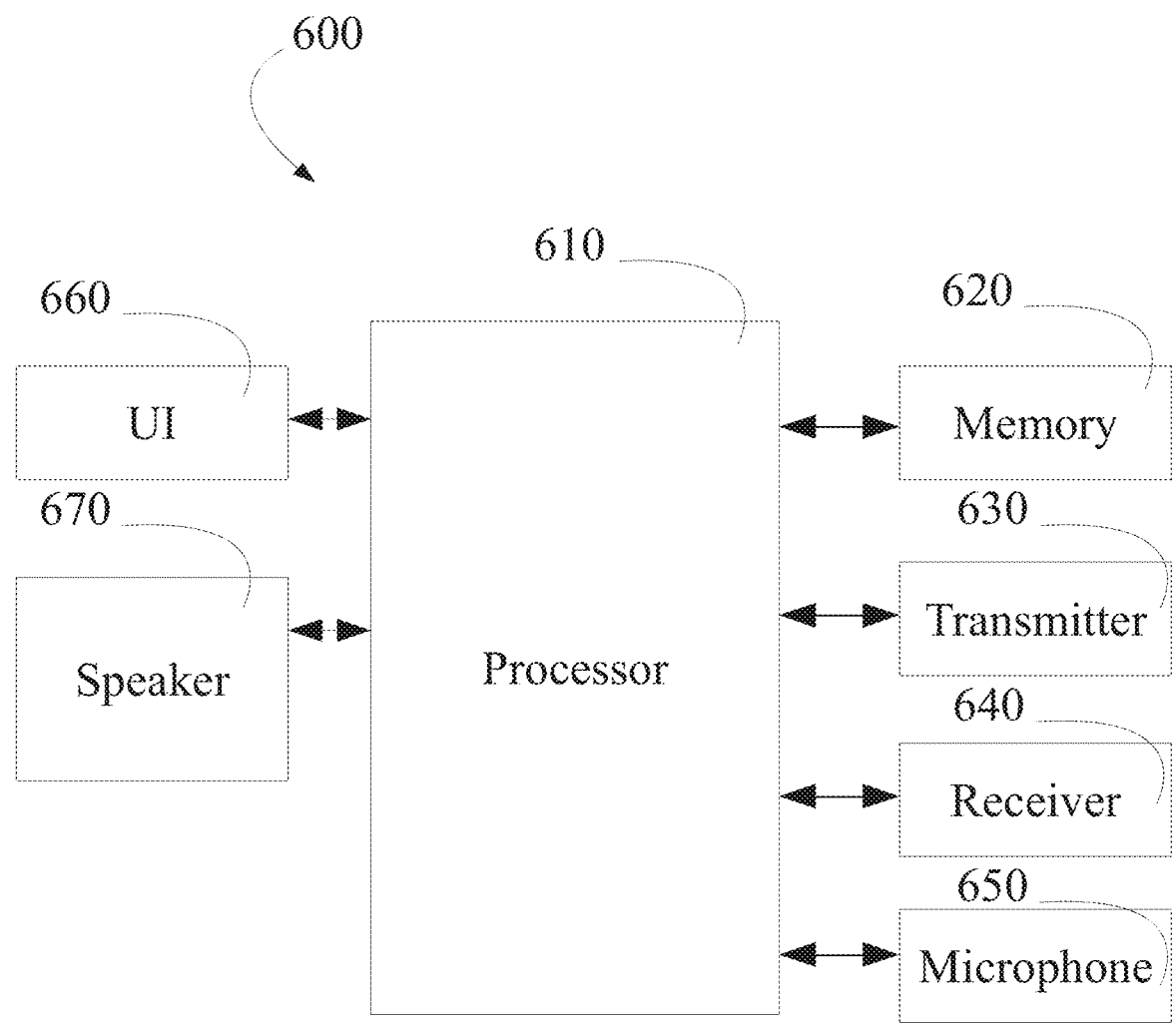
FIG. 6 shows, by way of example, a block diagram of an apparatus.

FIG. 6 shows, by way of example, a block diagram of an apparatus 600 capable of performing the method as disclosed herein. Illustrated is device 600, e.g. a user device, which may comprise, for example, a mobile communication device, such as a smartphone, or a personal computer. Comprised in device 600 is processor 610, which may comprise, for example, a single- or multi-core processor wherein a single-core processor comprises one processing core and a multi-core processor comprises more than one processing core. Processor 610 may be means for performing method steps in device 600. Processor 610 may be configured, at least in part by computer instructions, to perform actions. A processor may comprise circuitry, or be constituted as circuitry or circuitries, the circuitry or circuitries being configured to perform phases of methods in accordance with embodiments described herein.

Device 600 may comprise memory 620. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver.

Device 600 may comprise user interface, UI, 660. UI 660 may comprise at least one of a display, a keyboard, a touchscreen, a speaker 670 and a microphone 650.

The apparatus 600 may comprise or may have an access to the neural network model trained for a target phoneme. There may be different models trained for different target phonemes, e.g. a first target phoneme, a second target phoneme etc. Several phonemes of the word may be assessed at the same time in parallel using several models each trained for a different target phoneme.

Figure 7:
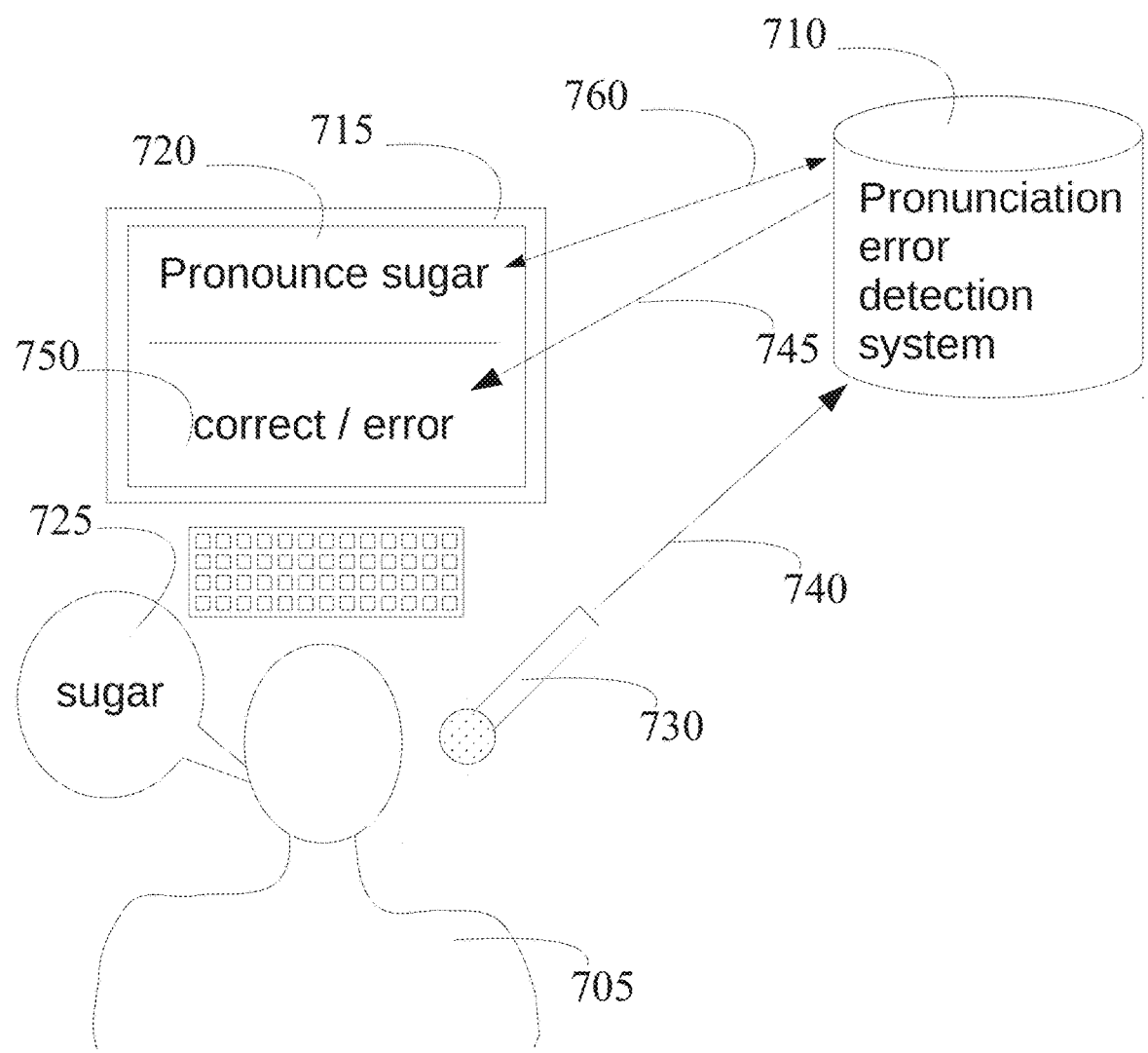
FIG. 7 shows, by way of example, use of a pronunciation error detection system.

FIG. 7 shows, by way of example, use of the pronunciation error detection system. The user 705 is learning pronunciation of a language, e.g. English language. The user is instructed to pronounce sugar. Instruction to pronounce the word may be e.g. displayed on a user interface of a user device, e.g. on a screen 715 of a computer or on a display of a smartphone. Instruction may be e.g. "Pronounce sugar" 720. The system is aware of the word in question, as described by the arrow 760 illustrating the communication between the system and the user interface. The word the pronunciation of which is to be trained by the user 705 may be received from the system 710, e.g. a server or one or more servers. The user may make a selection from a list which word the user would like to learn to pronounce correctly. Since the system is aware of the word in question, the system is able to provide a correct transcription to the phonetic branch representing ideal pronunciation of the word.

Figure 8:
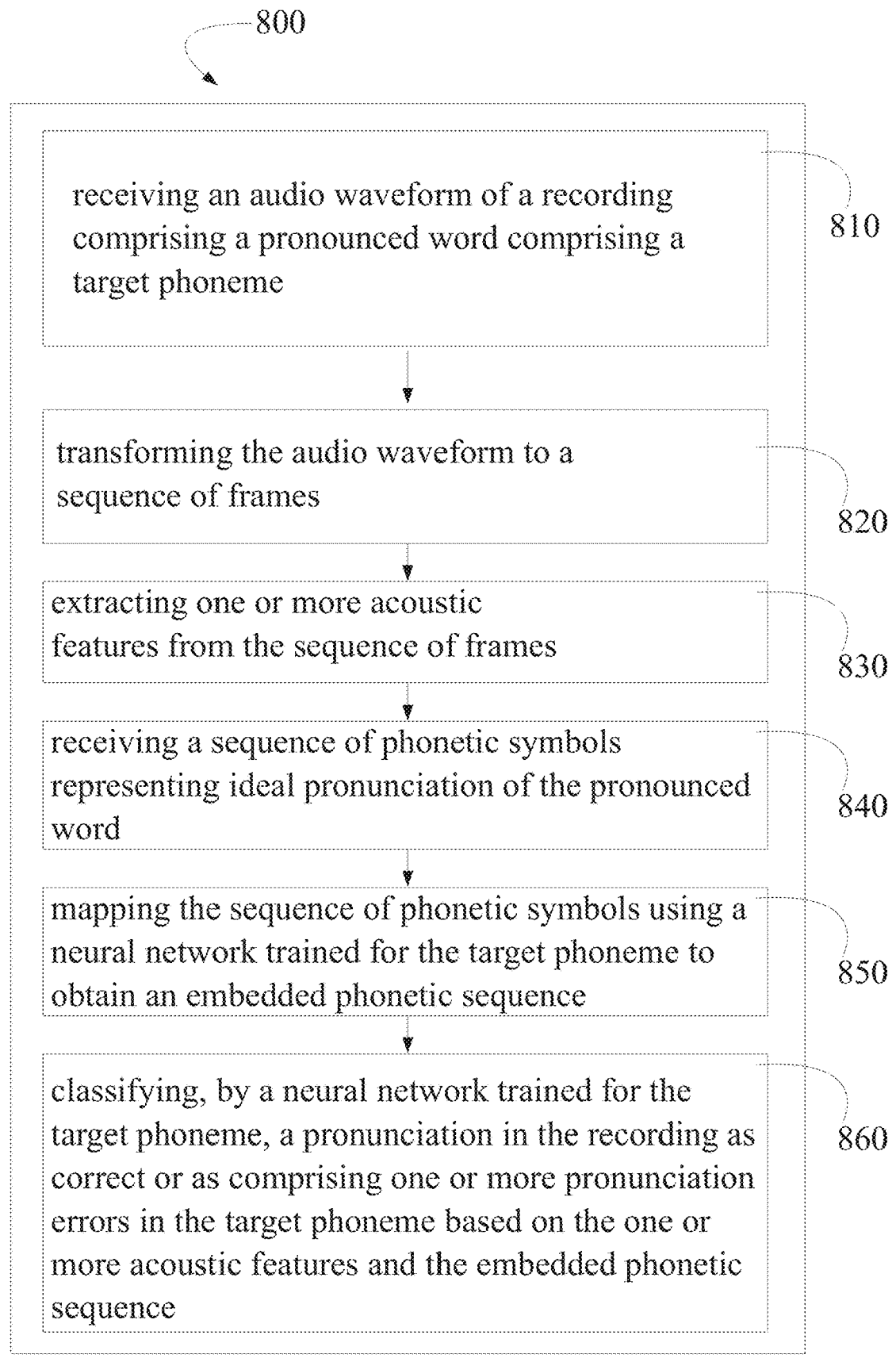
FIG. 8 is a flow chart of a method for detecting pronunciation error(s)

Then, the user 705 pronounces 725 the word sugar. The pronunciation is recorded using a microphone 730. The microphone may be a separate device connected to the user device or integrated to the user device, such as to a smartphone. The recording is transmitted 740 to the pronunciation error detection system 710. The block diagram of the system has been described in the context of the FIG. 1. A flow graph of the method performed by the system is shown in FIG. 8.

As an output, the system may provide a likelihood of an error class or correctness class. The output may be provided 745 for display on the user interface of the user device. For example, the output 750 may be "correct", if the likelihood of correctness class is high. The output may be a type of an error, e.g. "error 1" if the likelihood of error 1 is high. For example, for a word sugar, a typical error would be to pronounce [s ʊ g ə] instead of [ʃ ʊ u g ə], i.e. an alveolar [s] is pronounced instead of palate-alveolar [ʃ].

In response to providing output "correct", the user may be provided with a new word to be pronounced, or the user may be provided a list from which the user may select a word. Feedback may be provided in response to correct pronunciation. For example, the user may be encouraged and congratulated. In response to provided output of an error type or error class, the user may be provided feedback. For example, feedback may be given via video, text or a loudspeaker. For example, the user may be provided with a correct pronunciation via a loudspeaker. The user may be told which part of the word the user had a pronunciation error with. For example, the corresponding letter(s) from the word may be highlighted on the display of the user device. The user may be provided with more precise instruction relating to the actual error type detected in the pronunciation. For example, if the user has pronounced [s] instead of [ʃ], feedback may be given on how [ʃ] should sound like and where in the mouth it occurs. As another example, if the user has said "tree" instead of "three", a video may be selected and provided for display. The video may be displayed on the screen of the user device, e.g. a smartphone of the user. The selected video may show a personal tutor telling and showing how to put the tongue between the teeth and to blow air out. Instructions may be given in textual form, e.g. "put the tongue between the teeth and blow air out". Videos may be stored beforehand in a database, from which they may be retrieved for display. Videos may be assigned an index corresponding to a specific error. Then, the video may be selected based on the error type and the index.

Learning material may be adjusted based on the classification result, e.g. the error type, of the pronunciation of the user. Statistics on user performance for a phoneme may be aggregated, and the learning material to be presented to the user may be adjusted accordingly. For example, if the [ʃ]-model keeps predicting Error 1 for the user, the system will provide more words with this phoneme for user to practise on. Thus, in response to classifying the pronunciation as comprising one or more pronunciation errors in the target phoneme, one or more further words comprising the target phoneme may be selected. The one or more further words are different than the pronounced word in the previous recording. Then, the user may be provided with the one or more further words to be pronounced. For example, the word may be displayed to the user on the screen of the user interface, or the word may be provided via a speaker.

In addition or alternatively to phoneme-wise adjustment, adjustment of the learning material may be performed on higher level, i.e. aspect-wise, i.e. taking into account aspects such as aspiration, voicing etc. For example, if the user pronounces voiced [z] as [s] and voiced [b] as [p], more learning material may be provided with other phonemes, where voicing is a typical error aspect. For example, words may be provided with phoneme [ʒ] with one of the typical errors being [ʃ].

FIG. 8 is a flow graph of a method for detecting pronunciation error(s). The phases of the illustrated method may be performed by the device 600, for example, or in a control device configured to control the functioning thereof, when installed therein. Alternatively, the phases of the illustrated method may be performed by the system 710. The method 800 comprises receiving 810 an audio waveform of a recording comprising a pronounced word comprising a target phoneme. The method 800 comprises transforming 820 the audio waveform to a sequence of frames. The method 800 comprises extracting 830 one or more acoustic features from the sequence of frames. The method 800 comprises receiving 840 a sequence of phonetic symbols representing ideal pronunciation of the pronounced word. The method 800 comprises mapping 850 the sequence of phonetic symbols using a neural network trained for the target phoneme to obtain an embedded phonetic sequence. The method 800 comprises classifying 860, by a neural network trained for the target phoneme, a pronunciation in the recording as correct or as comprising one or more pronunciation errors in the target phoneme based on the one or more acoustic features and the embedded phonetic sequence.

By incorporating the phonetics branch, one model per target phoneme may be trained, as opposed to one-per-word. When the number of the words grows, the one-per-word models require linearly increasing amount of memory. The method disclosed herein has a constant memory requirement for any number of words, since models are trained for a target phoneme. Thus, with 44, or 45, models it may be possible to detect pronunciation errors or correctness of all English words. More efficient data utilisation is achieved due to the system's ability to learn the acoustic properties of phonemes shared by multiple words. Errors may be detected in words that are previously unseen in the training set, as long as the desired transcription is provided.

Figure 9A:
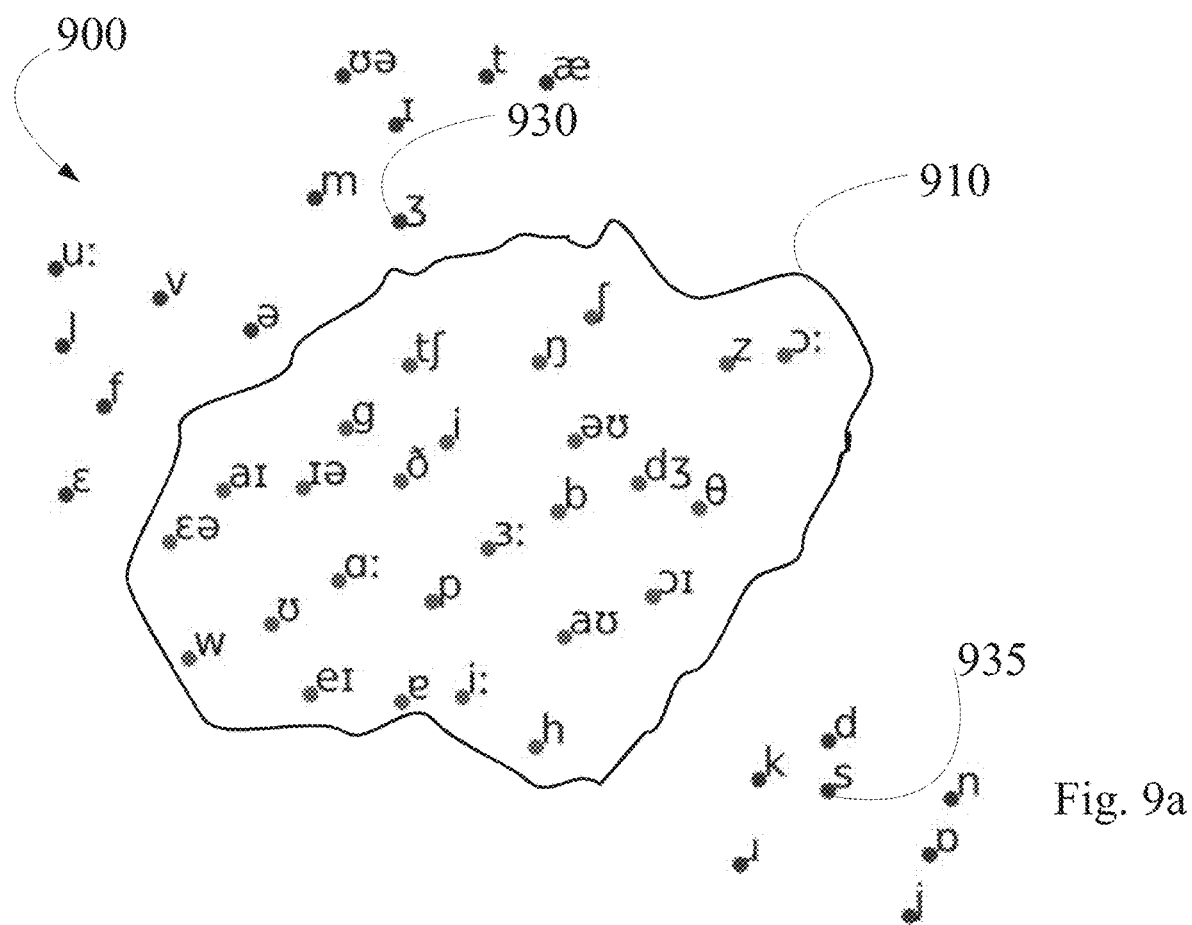
FIG. 9a shows, by way of example, a two-dimensional projection of a learned phoneme symbol embedding space.

FIG. 9a shows, by way of example, a two-dimensional projection 900 of a learned phoneme symbol embedding space. In this example, the pronunciation error detection system has been trained for a target phoneme [ʒ]. Typical errors are to use [s] or [ʃ] instead of [ʒ]. More precisely, FIG. 9a shows a t-distributed stochastic neighbour embedding (t-SNE) based two-dimensional projection of the representation of all the English phonemes in the embedding space after training the pronunciation error detection system for the target phone [ʒ]. The phonemes within an area marked with a line 910 are phonemes that have been absent from the training material. Those phonemes are clearly remained consistently clustered at the initialisation position. The rest of the phonemes are phonemes that have been present in the training words. The locations of those phonemes have been shifted. For example, if we consider a target phoneme [ʒ] 930 and its typical erroneous pronunciation as [s] 935, it may be noticed that they are located far from each other. This means that the embedding has learned the importance of separating between the two phonemes.

Figure 9B:
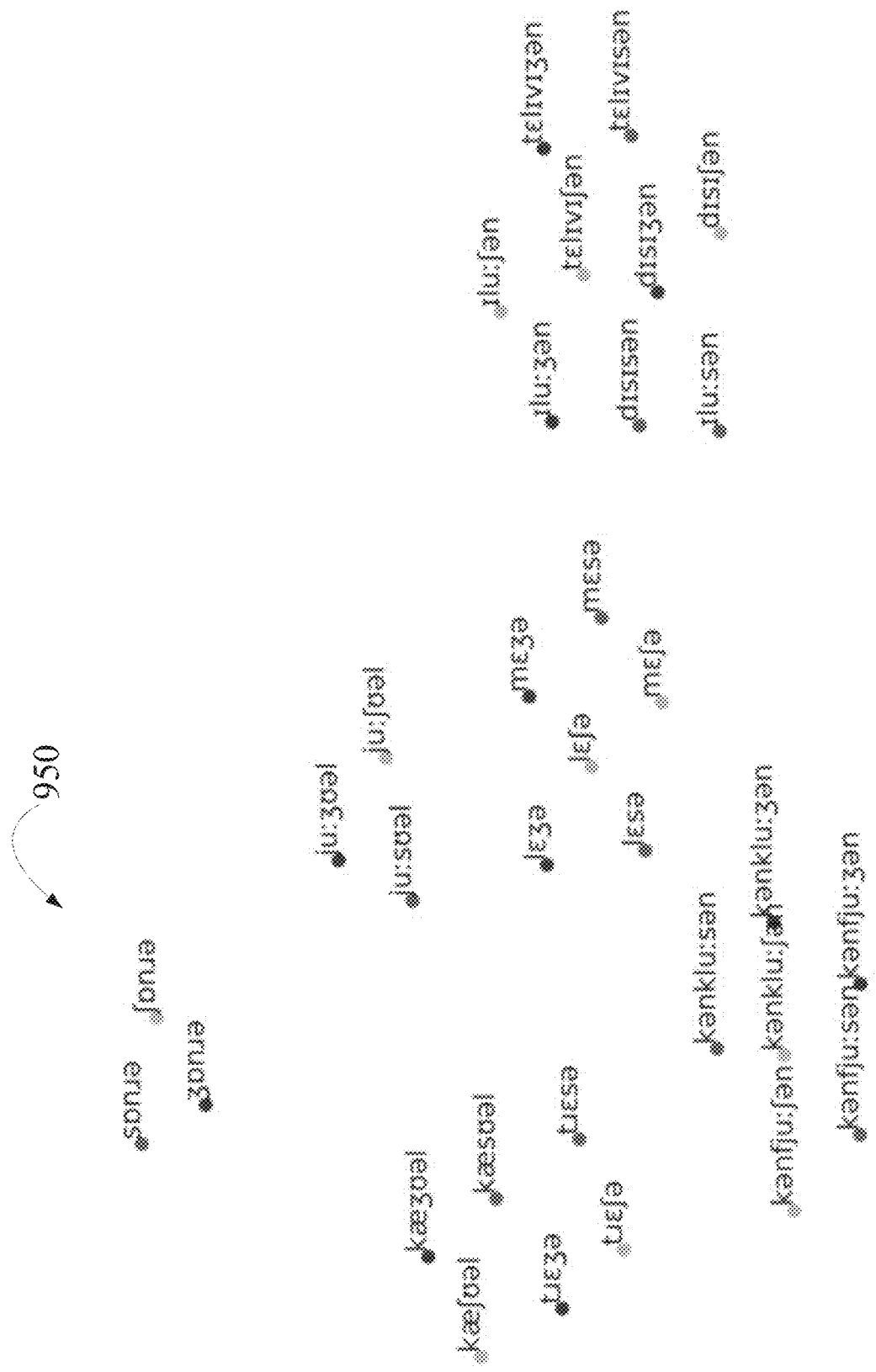
FIG. 9b shows, by way of example, a two-dimensional projection of words used in training a model and their typical erroneous pronunciation.

FIG. 9b shows, by way of example, a two-dimensional projection 950 of words used in training a model and their typical erroneous pronunciation. More precisely, FIG. 9b shows a two-dimensional projection of the recurrent block representation of the words decision, television, conclusion, illusion, confusion, usual, casual, measure, genre, leisure, treasure used in training of the model for target phoneme [ʒ]. In addition, their counterparts, where a typical error of substituting the phoneme [ʒ] with [s] or [ʃ] occurs, are represented. The counterparts are represented to illustrate how the system would treat such minimal pairs, if they were comprised in the training material. During training and inference, however, only intended correct pronunciation is seen by the phonetic branch. Minimal pairs are pairs of words that differ only in one phoneme.

The system may be trained for any language. For example, standard Spanish language is considered to comprise 24 phonemes of which 5 are vowels and 19 are consonants: a, e, i, o, u, p, b, m, n, f, t, d, θ, s, l, ɾ, r, tʃ, j, ɲ, k, g, x. Over half of these phonemes are also present in the list of English phonemes. The word "gente" [xente] (people in English) starts with a phoneme that doesn't exist in e.g. English. Thus, possible error categories might include [g] and [dʒ] because of the spelling, or [h] because that's the closest equivalent in English. Learners might also have difficulties with the Spanish rolled r as in "perro" [pero], possible errors being other r sounds, e.g. [ɹ] or [ʁ]. Examples of the Spanish words that may be used to train the model for target phoneme [r] are perro, rojo, rico, gorro, arroz, guitarra, correr.

The invention claimed is:

1. A method, comprising:
receiving, in an acoustic branch of a system for automatic detection of pronunciation errors, an audio waveform of a recording comprising a known pronounced word comprising a target phoneme;
transforming the audio waveform to a sequence of frames;
extracting one or more acoustic features from the sequence of frames;
inputting the one or more acoustic features to a recurrent block of the acoustic branch;
receiving, in a phonetic branch of the system for automatic detection of pronunciation errors, a sequence of phonetic symbols representing ideal pronunciation of the pronounced word;
mapping the sequence of phonetic symbols using a neural network trained for the target phoneme to obtain an embedded phonetic sequence;
inputting the embedded phonetic sequence to a recurrent block of the phonetic branch; and
classifying, by a neural network trained for the target phoneme, a pronunciation in the recording as correct or as comprising one or more pronunciation errors in the target phoneme based on a representation of the one or more acoustic features as obtained from the recurrent block of the acoustic branch and a representation of the sequence of phonetic symbols as obtained from the recurrent block of the phonetic branch, wherein the classifying comprises: concatenating the representation of the one or more acoustic features as obtained from the recurrent block of the acoustic branch and the representation of the sequence of phonetic symbols as obtained from the recurrent block of the phonetic branch to learn the neural network for detecting one or more pronunciation errors in the target phoneme from the one or more acoustic features.

2. The method according to claim 1, further comprising:
classifying, in response to detecting that a likelihood of the one or more pronunciation errors is below a predetermined threshold, a pronunciation in the recording as correct.

3. The method according to claim 1, further comprising:
providing feedback to a user based on the classified pronunciation.

4. The method according to claim 1, further comprising:
selecting, in response to classifying the pronunciation as comprising one or more pronunciation errors in the target phoneme, a video showing correct pronunciation of the word comprising the target phoneme; and
providing the selected video for display.

5. The method according to claim 1, further comprising:
selecting, in response to classifying the pronunciation as comprising one or more pronunciation errors in the target phoneme, one or more further words comprising the target phoneme, wherein the one or more further words are different than the pronounced word in the recording; and
providing a user with the one or more further words to be pronounced.

6. The method according to claim 1, wherein the pronounced word comprises a second target phoneme; and wherein the method further comprises:
mapping the sequence of phonetic symbols using a neural network trained for the second target phoneme to obtain a second embedded phonetic sequence; and
classifying, by a neural network trained for the second target phoneme, a pronunciation in the recording as correct or comprising one or more pronunciation errors in the second target phoneme based on the one or more acoustic features and the second embedded phonetic sequence.

7. An apparatus comprising at least one processor; and at least one memory including computer program code, the at least one memory and the computer program code configured to, with the at least one processor, cause the apparatus to perform:
receiving, in an acoustic branch of a system for automatic detection of pronunciation errors, an audio waveform of a recording comprising a known pronounced word comprising a target phoneme;
transforming the audio waveform to a sequence of frames;
extracting one or more acoustic features from the sequence of frames;
inputting the one or more acoustic features to a recurrent block of the acoustic branch;
receiving, in a phonetic branch of the system for automatic detection of pronunciation errors, a sequence of phonetic symbols representing ideal pronunciation of the pronounced word;

mapping the sequence of phonetic symbols using a neural network trained for the target phoneme to obtain an embedded phonetic sequence;

inputting the embedded phonetic sequence to a recurrent block of the phonetic branch; and classifying, by a neural network trained for the target phoneme, a pronunciation in the recording as correct or as comprising one or more pronunciation errors in the target phoneme based on a representation of the one or more acoustic features as obtained from the recurrent block of the acoustic branch and a representation of the sequence of phonetic symbols as obtained from the recurrent block of the phonetic branch, wherein the classifying comprises: concatenating the representation of the one or more acoustic features as obtained from the recurrent block of the acoustic branch and the representation of the sequence of phonetic symbols as obtained from the recurrent block of the phonetic branch to learn the neural network for detecting one or more pronunciation errors in the target phoneme from the one or more acoustic features.

8. The apparatus according to claim 7, further comprising:
classifying, in response to detecting that a likelihood of the one or more pronunciation errors is below a predetermined threshold, a pronunciation in the recording as correct.

9. The apparatus according to claim 7, further comprising:
providing feedback to a user based on the classified pronunciation.

10. The apparatus according to claim 7, further comprising:
selecting, in response to classifying the pronunciation as comprising one or more pronunciation errors, a video showing correct pronunciation of the word comprising the target phoneme; and providing the selected video for display.

11. The apparatus according to claim 7, further comprising:
selecting, in response to classifying the pronunciation as comprising one or more pronunciation errors in the target phoneme, one or more further words comprising the target phoneme, wherein the one or more further words are different than the pronounced word in the recording; and
providing a user with the one or more further words to be pronounced.

12. The apparatus according to claim 7, wherein the pronounced word comprises a second target phoneme; and wherein the apparatus further comprises:
mapping the sequence of phonetic symbols using a neural network trained for the second target phoneme to obtain a second embedded phonetic sequence;
inputting the second embedded phonetic sequence to a recurrent block of the phonetic branch of the system for automatic detection of pronunciation errors; and
classifying, by a neural network trained for the second target phoneme, a pronunciation in the recording as correct or comprising one or more pronunciation errors in the second target phoneme based on the one or more acoustic features as obtained from the recurrent block of the acoustic branch and the second embedded phonetic sequence as obtained from the recurrent block of the phonetic branch.

13. A non-transitory computer readable medium comprising program instructions that, when executed by at least one processor, cause an apparatus to at least perform:
receiving, in an acoustic branch of a system for automatic detection of pronunciation errors, an audio waveform of a recording comprising a known pronounced word comprising a target phoneme;
transforming the audio waveform to a sequence of frames;
extracting one or more acoustic features from the sequence of frames;
inputting the one or more acoustic features to a recurrent block of the acoustic branch;
receiving, in a phonetic branch of the system for automatic detection of pronunciation errors, a sequence of phonetic symbols representing ideal pronunciation of the pronounced word;
mapping the sequence of phonetic symbols using a neural network trained for the target phoneme to obtain an embedded phonetic sequence;
inputting the embedded phonetic sequence to a recurrent block of the phonetic branch; and
classifying, by a neural network trained for the target phoneme, a pronunciation in the recording as correct or as comprising one or more pronunciation errors in the target phoneme based on a representation of the one or more acoustic features as obtained from the recurrent block of the acoustic branch and a representation of the sequence of phonetic symbols as obtained from the recurrent block of the phonetic branch, wherein the classifying comprises: concatenating the representation of the one or more acoustic features as obtained from the recurrent block of the acoustic branch and the representation of the sequence of phonetic symbols as obtained from the recurrent block of the phonetic branch to learn the neural network for detecting one or more pronunciation errors in the target phoneme from the one or more acoustic features.

14. The non-transitory computer readable medium according to claim 13, wherein the pronounced word comprises a second target phoneme; and wherein the apparatus is further caused to perform:
mapping the sequence of phonetic symbols using a neural network trained for the second target phoneme to obtain a second embedded phonetic sequence;
inputting the second embedded phonetic sequence to a recurrent block of the phonetic branch of the system for automatic detection of pronunciation errors; and
classifying, by a neural network trained for the second target phoneme, a pronunciation in the recording as correct or comprising one or more pronunciation errors in the second target phoneme based on the one or more acoustic features as obtained from the recurrent block of the acoustic branch and the second embedded phonetic sequence as obtained from the recurrent block of the phonetic branch.

* * * * *